United States Patent
Wang (10) Patent No.: US 9,795,093 B1
(45) Date of Patent: Oct. 24, 2017

(54) LOW-FLOW EMITTER

(71) Applicant: ARIA PRODUCTS L.L.C., Dover, DE (US)

(72) Inventor: Daniel Chun Wang, Chung Hua Hsien (TW)

(73) Assignee: Aria Products L.L.C., Dover, DE (US)

( * ) Notice: Subject to any disclaimer, the term of this patent is extended or adjusted under 35 U.S.C. 154(b) by 0 days.

(21) Appl. No.: 15/253,267

(22) Filed: Aug. 31, 2016

(51) Int. Cl.
*A01G 25/02* (2006.01)
*B05B 1/02* (2006.01)
*B05B 1/32* (2006.01)

(52) U.S. Cl.
CPC .............. *A01G 25/023* (2013.01); *B05B 1/02* (2013.01); *B05B 1/326* (2013.01)

(58) Field of Classification Search
CPC ........ A01G 25/02; A01G 25/023; B05B 1/02; B05B 1/30; B05B 1/32; B05B 1/326
See application file for complete search history.

(56) References Cited

U.S. PATENT DOCUMENTS

| | | | | |
|---|---|---|---|---|
| 2,650,132 A * | 8/1953 | Reinecke | ................. | B05B 1/14 239/391 |
| 2,723,879 A * | 11/1955 | Martin | ................... | B05B 1/265 239/193 |
| 3,810,582 A * | 5/1974 | Lodge | ................... | A01G 25/023 137/883 |
| 3,908,694 A * | 9/1975 | Spears | ................... | A01G 25/02 137/513.3 |
| 4,752,031 A * | 6/1988 | Merrick | ................. | B05B 15/10 239/193 |
| 5,004,161 A | 4/1991 | Antel | | |
| 7,156,326 B1 * | 1/2007 | Chou | ..................... | B05B 1/304 239/452 |
| 8,662,414 B2 * | 3/2014 | Causby | ................. | A01G 25/02 137/859 |

* cited by examiner

*Primary Examiner* — Christopher Kim
(74) *Attorney, Agent, or Firm* — Muncy, Geissler, Olds & Lowe, P.C.

(57) ABSTRACT

A low-flow emitter includes a rotatable cap and a body. The rotatable cap has a threaded hole and a receiving chamber communicating with the threaded hole. The wall of the receiving chamber has plural grooves, which are annularly arranged in a spaced manner around the threaded hole. The body has a shaft. The shaft has an external thread and a flexible rib adjacent to the external thread and is connected to the rotatable cap by threaded connection between the external thread and the threaded hole such that the flexible rib is engaged in one of the grooves. When the rotatable cap is rotated to adjust the amount of water delivered by the low-flow emitter, the area of contact between the grooves of the rotatable cap and the flexible rib of the body stays unchanged, allowing the rotatable cap to produce a consistent feel to the operator.

6 Claims, 9 Drawing Sheets

LOW-FLOW EMITTER

BACKGROUND OF THE INVENTION

1. Technical Field

The present invention relates to drip irrigation and more particularly to a low-flow emitter capable of providing a consistent feel to a user's hand while being operated by the hand.

2. Description of Related Art

In low-flow irrigation, sometimes known as micro-irrigation, water is delivered to the irrigation area at low and uniform flow rate, thereby conserving water.

For adjustable low-flow emitter, a means of retaining flow rate setting is often desirable. U.S. Pat. No. 5,004,161, entitled "adjustable miniature watering device", for example, discloses a watering device including a rotatable cap and a body. The rotatable cap has a flexible rib while the body has a grooved inner surface with annularly arranged grooves. The flexible rib of the rotatable cap has substantially the same axial length as the grooves of the body and is engageable in any of the grooves. When the rotatable cap is rotated to adjust the amount of water delivered by the watering device, the area of contact between the flexible rib of the rotatable cap and the grooved inner surface of the body changes with the axial displacement of the rotatable cap with respect to the body. The change in the area of contact not only produces a different feel to the operator's hand with which the rotatable cap is being operated (e.g., the tightness between the rotatable cap and the body is changed), but also alters the amplitude of the sound generated between the flexible rib of the rotatable cap and the grooved inner surface of the body.

In the interest of user friendliness, a low-flow emitter having a consistent operating means is desired.

BRIEF SUMMARY OF THE INVENTION

The primary objective of the present invention is to provide a low-flow emitter that provides a consistent feel to a user's hand while being operated by the hand to adjust the amount of water delivered by the low-flow emitter.

To achieve the above objective, the low-flow emitter of the present invention includes a rotatable cap and a body. The rotatable cap has a threaded hole and a receiving chamber in communication with the threaded hole. The wall of the receiving chamber has a plurality of grooves, and the grooves are annularly arranged in a spaced manner around the threaded hole. The body has a shaft. The outer periphery of the shaft has an external thread and a flexible rib. The shaft is threadedly connected to the threaded hole of the rotatable cap via the external thread and is thus connected to the rotatable cap, with the flexible rib of the shaft engaged in one of the grooves of the rotatable cap. When the rotatable cap is rotated with respect to the body to adjust the amount of water delivered by the low-flow emitter, the area of contact between the grooves of the rotatable cap and the flexible rib of the body stays the same, so the rotatable cap provides a consistent feel to the operator's hand that is operating the rotatable cap.

Other advantages and features of the present invention will be fully understood by reference to the following specification in conjunction with the accompanying drawings, in which like reference signs denote like components of structure.

DETAILED DESCRIPTION OF THE INVENTION

The present invention relates to a low-flow emitter 10. The low-flow emitter 10 includes a rotatable cap 20 and a body 30. The low-flow emitter 10 according to the embodiments of the present invention will be described with reference to the drawings. Repeated description thereof may be omitted.

First Embodiment

FIGS. 1 through 6 pertain to a first embodiment of the invention.

Figure 1:
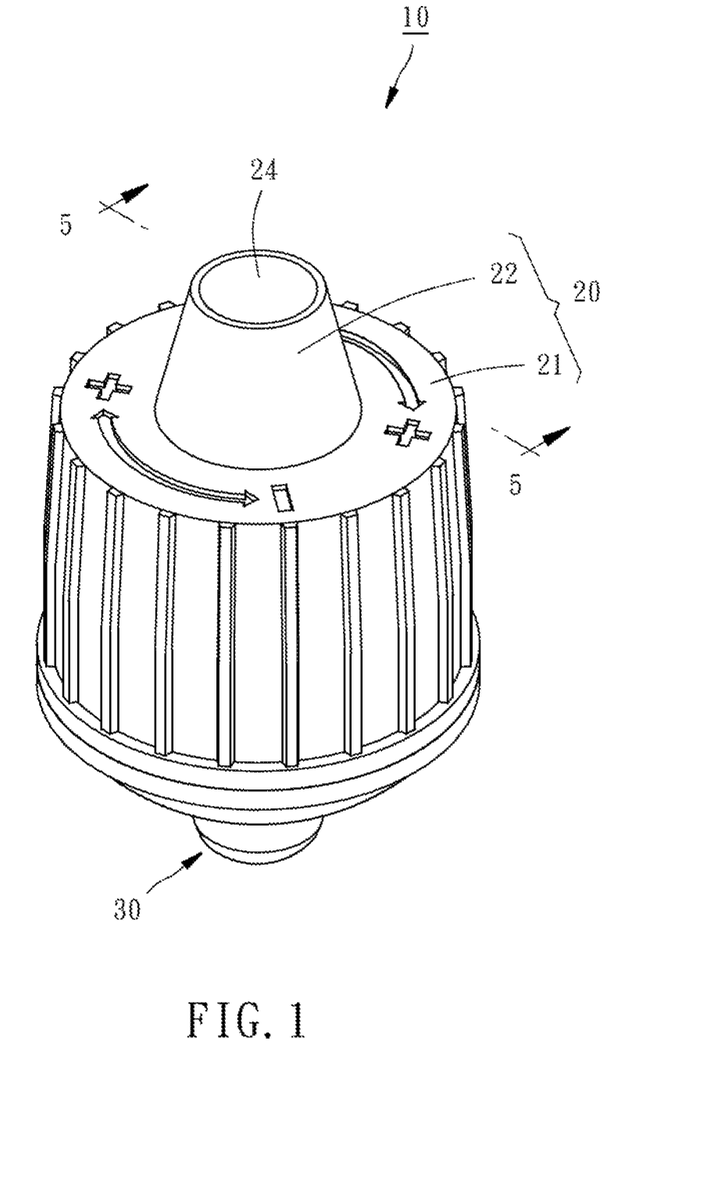
FIG. 1 is a perspective view of the low-flow emitter in the first embodiment of the present invention.
Figure 3:
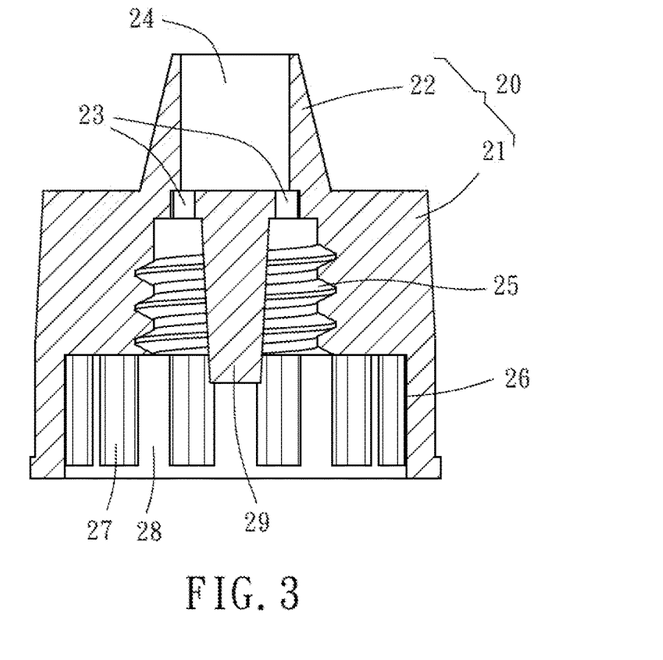
FIG. 3 is a sectional view of the rotatable cap of the low-flow emitter in FIG. 1.

The rotatable cap 20, referring to FIGS. 1 and 3, includes a cap body 21 and a tube portion 22. The cap body 21 has a threaded hole 25 and a receiving chamber 26. The wall of the receiving chamber 26 has a plurality of ridges 27 which are annularly arranged around the threaded hole 25 in a spaced manner such that each two adjacent ridges 27 form a groove 28 therebetween. The cap body 21 has an outer end surface formed with four water outlets 23, which are annularly arranged in a spaced manner. The threaded hole 25 has one end in communication with the four water outlets 23 and the other end in communication with the receiving chamber 26. The tube portion 22 has a bottom end connected to the outer end surface of the cap body 21. The tube portion 22 further has a first channel 24, which has one end in communication with the water outlets 23 of the cap body 21 and the other end in communication with the outside. The cap body 21 further has a tapered column 29, which is located between the four water outlets 23 and extends away from the first channel 24 of the tube portion 22 into the threaded hole 25. The outer diameter of the tapered column 29 decreases in a direction away from the first channel 24 of the tube portion 22.

Figure 2:
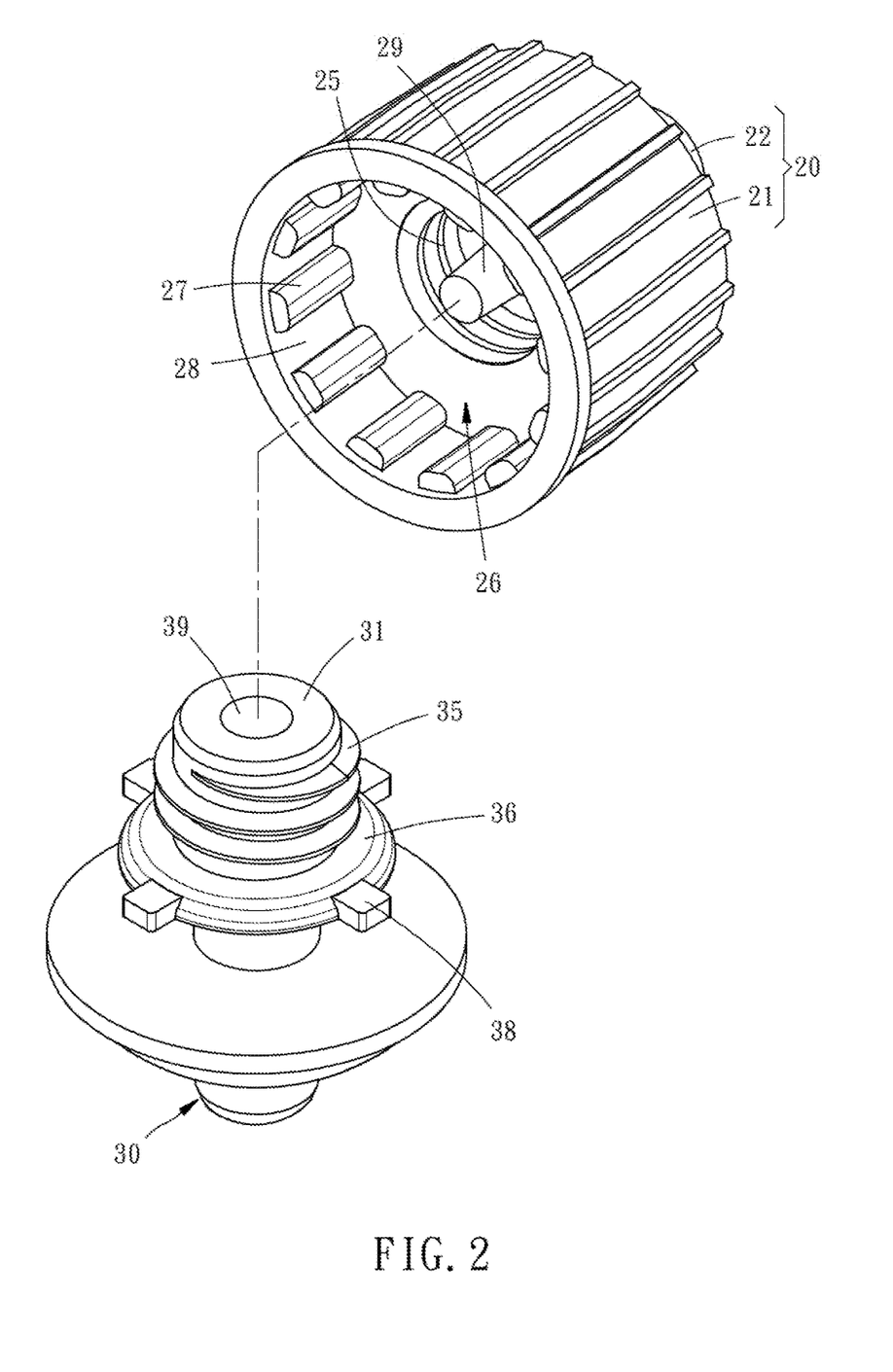
FIG. 2 is an exploded perspective view of the low-flow emitter in FIG. 1.
Figure 4:
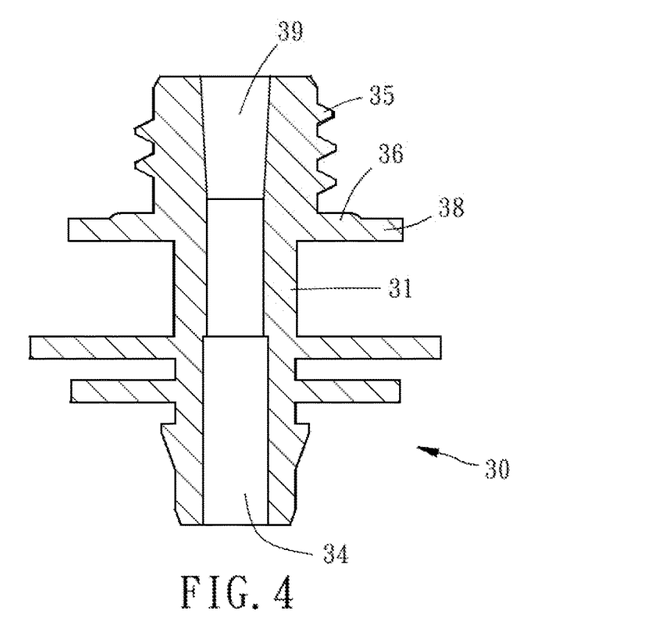
FIG. 4 is a sectional view of the body of the low-flow emitter in FIG. 1.

The body 30, referring to FIGS. 2 and 4, has a shaft 31. The outer periphery of the shaft 31 has an external thread 35 and a flange 36 adjacent to the external thread 35. Two pairs of flexible ribs 38 extend outward from the periphery of the flange 36 in the radial direction of the shaft 31. The flexible ribs 38 have a shorter axial length than the grooves 28 of the rotatable cap 20. The body 30 further has a second channel 34 extending through the shaft 31. The second channel 34 has a tapered opening 39 at one end. The shape of the tapered opening 39 matches that of the tapered column 29 of the rotatable cap 20.

Figure 5:
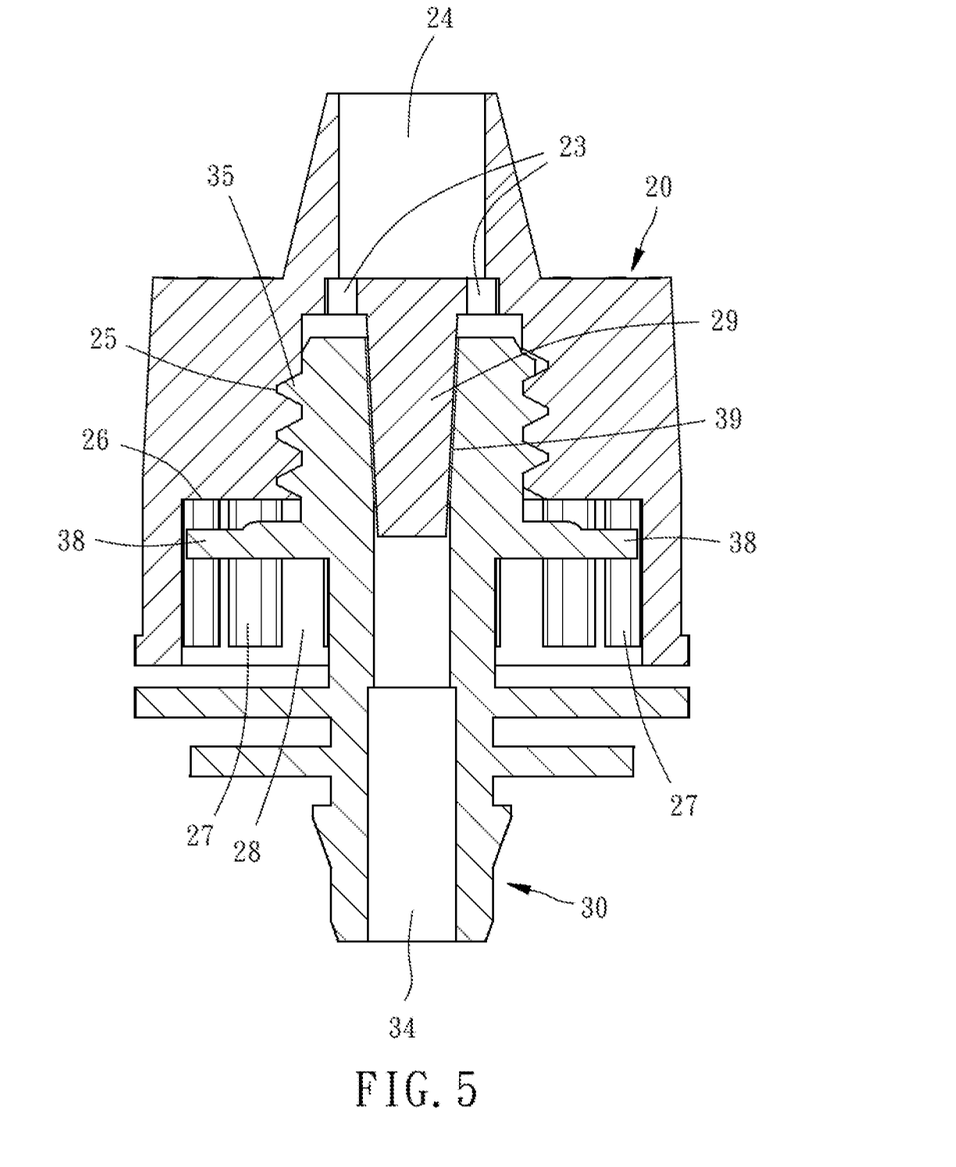
FIG. 5 is a sectional view taken along the line 5-5 in FIG. 1.
Figure 6:
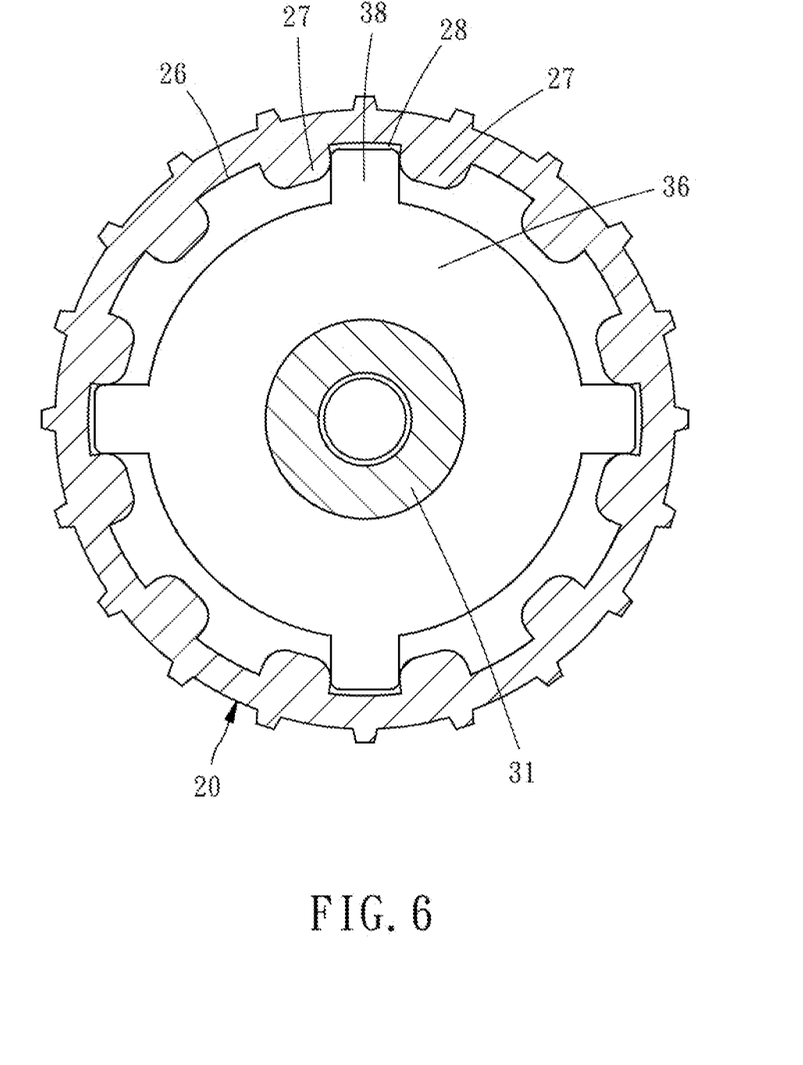
FIG. 6 is a bottom sectional view of the low-flow emitter in FIG. 1.
Figure 7:
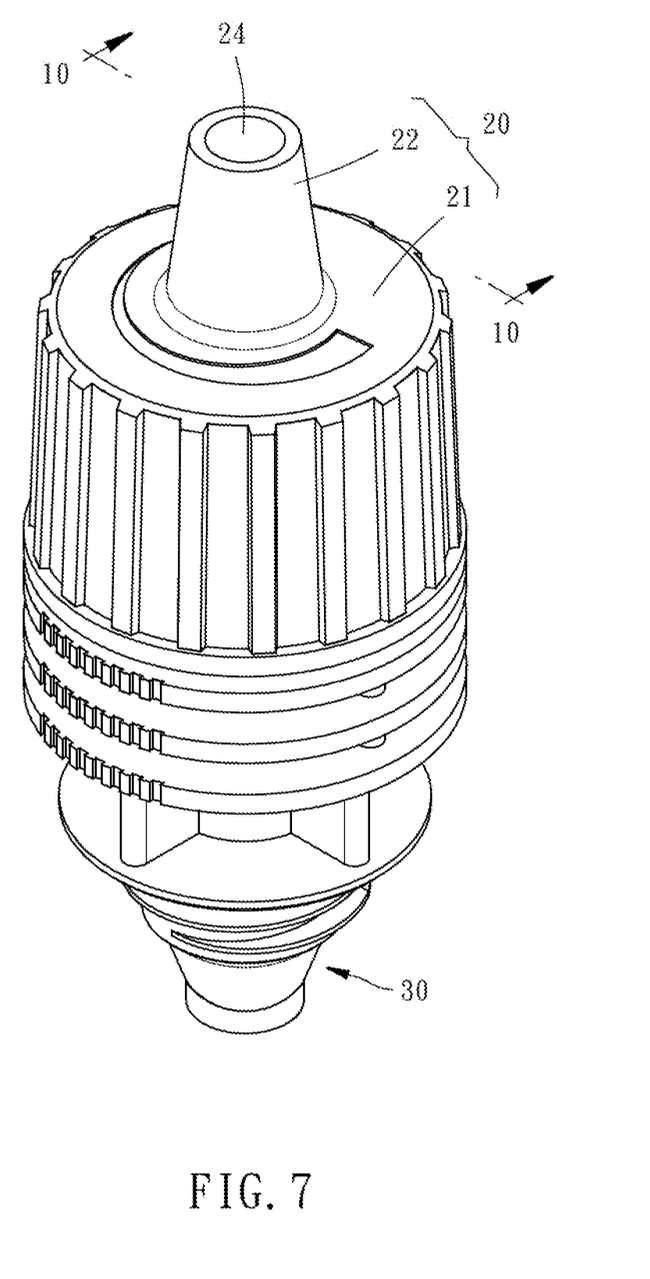
FIG. 7 is a perspective view of the low-flow emitter in the second embodiment of the present invention.
Figure 8:
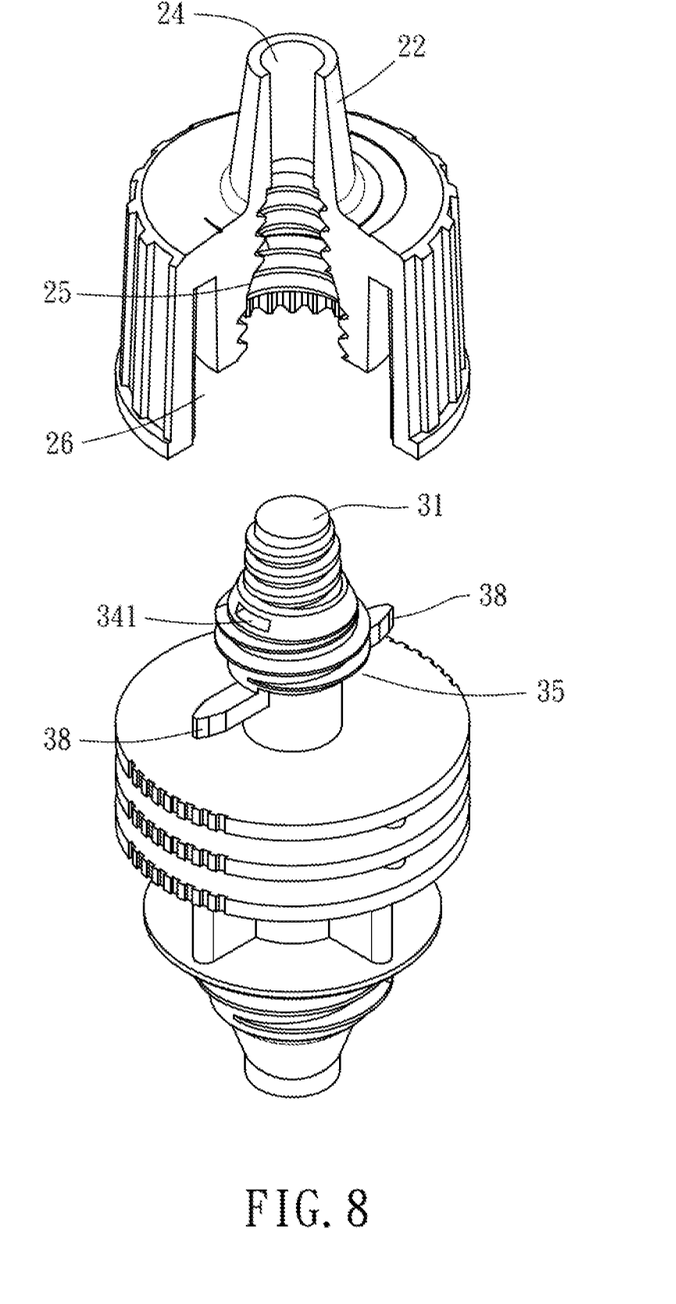
FIG. 8 is an exploded perspective view of the low-flow emitter in FIG. 7.
Figure 9:
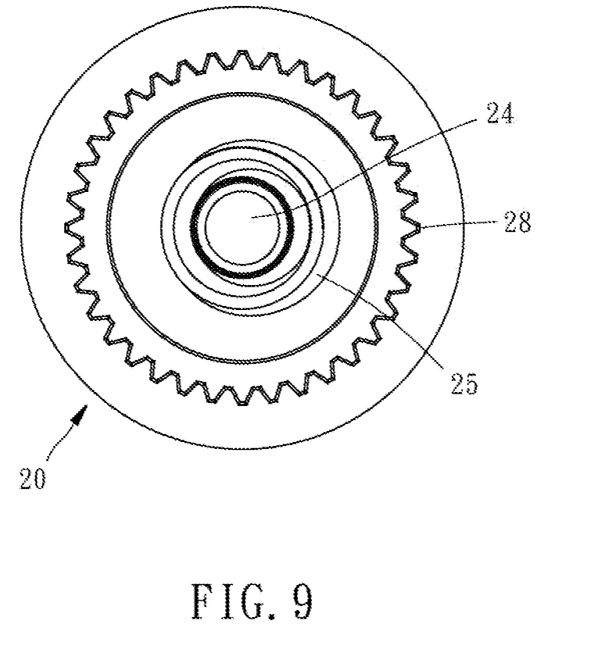
FIG. 9 is a bottom view of the rotatable cap of the low-flow emitter in FIG. 7.

During assembly, referring to FIGS. 5 and 6, the rotatable cap 20 connects to the body 30 via engagement between the threaded hole 25 of the cap body 21 of the rotatable cap 20 and the external thread 35 of the shaft 31 of the body 30. After completion of the assembly, the flexible ribs 38 of the body 30 are engaged in the corresponding grooves 28 of the rotatable cap 20 respectively. Also, the tapered column 29 of the rotatable cap 20 is received in the tapered opening 39 of the second channel 34 of the body 30, allowing water to flow from the second channel 34 of the body 30 through the gap between the wall of the tapered opening 39 and the tapered column 29 and then through the water outlets 23 of the rotatable cap 20 into the first channel 24 of the rotatable cap 20, before the water flows out of the first channel 24 of the rotatable cap 20 to provide drip irrigation.

To adjust the amount of water delivered by the low-flow emitter, the rotatable cap 20 is rotated so that, by means of its threaded connection with the body 30, the rotatable cap 20 is displaced upward or downward with respect to the body 30. As a result, the gap between the tapered column 29 of the rotatable cap 20 and the wall of the tapered opening 39 of the body 30 is changed in size to adjust the amount of the water delivered, thanks to the matching shapes of the tapered column 29 and the tapered opening 39.

In the course in which the rotatable cap 20 is rotated, the area of contact between the grooves 28 of the rotatable cap 20 and the flexible ribs 38 of the body 30 remains unchanged because the ridges 27 and grooves 28 of the rotatable cap 20 are annularly arranged and have a greater axial length than the flexible ribs 38 of the body 30. Now that the aforesaid area of contact is invariable, the operator's hand that is operating the rotatable cap 20 will have a consistent feel during the entire operation, and the sound generated by engagement between the grooves 28 of the rotatable cap 20 and the flexible ribs 38 of the body 30 will have the same amplitude throughout. It should be pointed out that the body 30 only requires one flexible rib 38 in order to produce the foregoing effects together with the grooves 28 of the rotatable cap 20. The flexible ribs 38 of the body 30 in this embodiment are provided in pairs to enable uniform application of force to the rotatable cap 20 during operation so that high structural stability is achieved.

Second Embodiment

FIGS. 7 through 10 pertain to a second embodiment of the invention. In this case, the rotatable cape 20 has a first channel 24 communicating directly with the threaded hole 25 and two flexible ribs 38 extending outwardly and radially from the outer periphery of the shaft 31. The body 30 has a second channel 34 formed in the shaft 31 and not penetrating the shaft 31 axially, and that the shaft 31 is provided with an opening 341 extending in the radial direction of the shaft 31 in order for the second channel 34 to communicate with the space around the shaft 31 through the opening 341.

Figure 10:
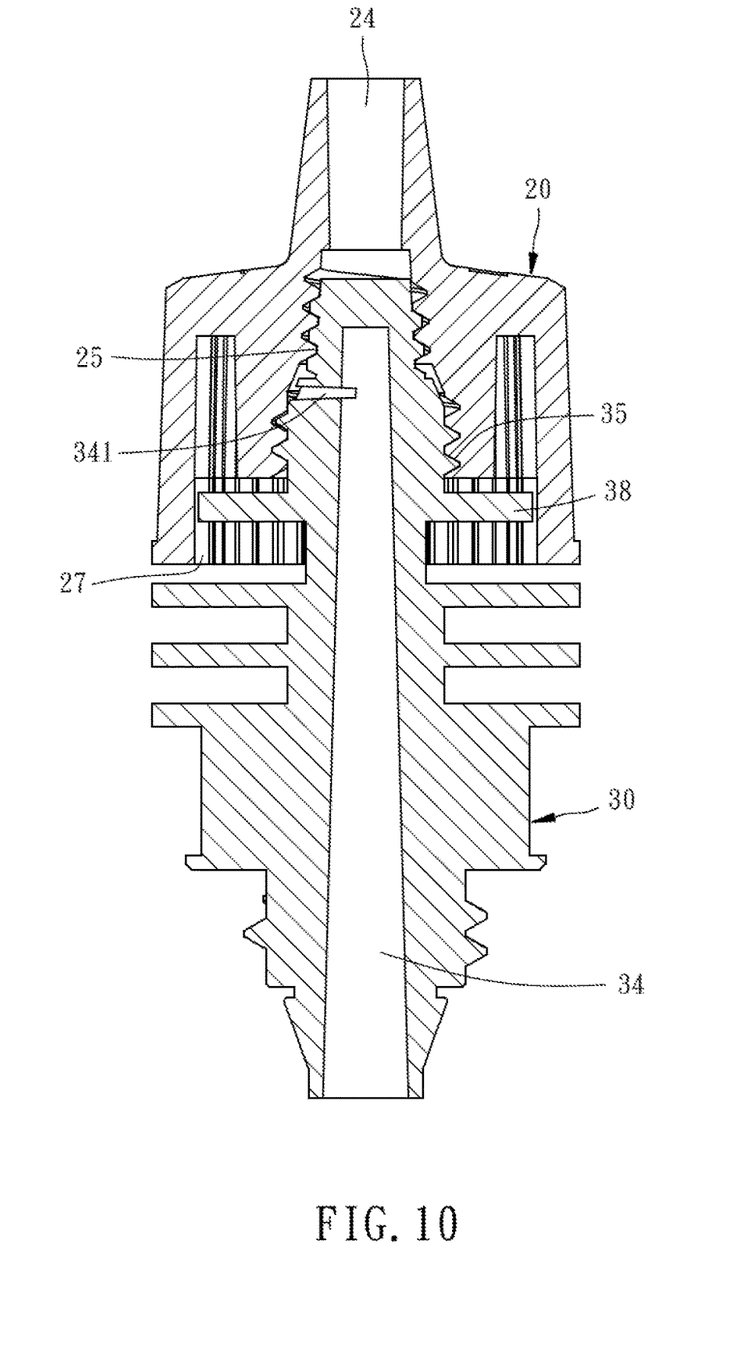
FIG. 10 is a sectional view taken along the line 10-10 in FIG. 7.

During assembly, referring to FIG. 10, the external thread 35 of the shaft 31 of the body 30 is threadedly connected with the threaded hole 25 of the rotatable cap 20 such that the two flexible ribs 38 are engaged in the corresponding grooves 28 of the rotatable cap 20 respectively. Water can then run from the second channel 34 of the body 30 through the opening 341 into the helical space between the external thread 35 of the shaft 31 and the wall of the threaded hole 25 of the rotatable cap 20, and from this helical space into the first channel 24 before flowing out.

In the second embodiment, in which water runs through a different path from that in the first embodiment, the flexible ribs 38 of the body 30 still lie in the corresponding grooves 28 of the rotatable cap 20 respectively, so the area of contact between the grooves 28 of the rotatable cap 20 and the flexible ribs 38 of the body 30 will also remain unchanged, allowing the rotatable cap 20 to provide a consistent feel to the operator's hand while being operated by the very hand.

The preceding description is meant to be illustrative of preferred embodiments and should not be construed as limiting the scope of the present invention. Various modifications, which would be readily apparent to one skilled in the art, are intended to be within the scope of the present invention. Accordingly, the only limitations to the scope of the present invention are set forth in the following claims appended hereto.

What is claimed is:

1. A low-flow emitter, comprising:
   a rotatable cap having a threaded hole and a receiving chamber communicating axially with the threaded hole, the receiving chamber having a wall provided with a plurality of grooves, the grooves being annularly arranged in a spaced manner around the threaded hole; and
   a body having a shaft, the shaft having an outer periphery provided with an external thread and a flexible rib, the external thread being threadedly connected with the threaded hole of the rotatable cap, the flexible rib being selectively engageable in any of the grooves of the rotatable cap.

2. The low-flow emitter of claim 1, wherein the grooves of the rotatable cap have a greater axial length than the flexible rib of the shaft.

3. The low-flow emitter of claim 1, wherein the wall of the receiving chamber of the rotatable cap is provided with a plurality of ridges, and each two adjacent said ridges form a said groove therebetween.

4. The low-flow emitter of claim 1, wherein the body has an outer periphery provided with a flange adjacent to the external thread, and the flexible rib extends outward from a periphery of the flange in a radial direction of the shaft.

5. The low-flow emitter of claim 1, wherein the rotatable cap has a tapered column in the threaded hole, and the body has a second channel extending through the shaft; said second channel having an end provided with a tapered opening, the tapered opening receiving the tapered column of the rotatable cap.

6. The low-flow emitter of claim 1, wherein the shaft is axially provided with a second channel and radially provided with an opening, and the opening communicates with the second channel and a space around the shaft.

* * * * *